US005326471A

United States Patent [19]

Pietzsch

[11] Patent Number: 5,326,471

[45] Date of Patent: Jul. 5, 1994

[54] MICROSTRAINER FILTER DECK PANEL

[75] Inventor: Kurt E. Pietzsch, Wiesbaden-Sonnenberg, Fed. Rep. of Germany

[73] Assignee: Dorr-Oliver Incorporated, Milford, Conn.

[21] Appl. No.: 992,979

[22] Filed: Dec. 18, 1992

[30] Foreign Application Priority Data

Jan. 9, 1992 [DE] Fed. Rep. of Germany ....... 4200304

[51] Int. Cl.[5] ........ B01D 33/067

[52] U.S. Cl. ........ 210/402; 210/450; 210/499; 209/270

[58] Field of Search ........ 210/402, 403, 404, 499, 210/232, 450; 209/270, 284, 288; 140/109

[56] References Cited

U.S. PATENT DOCUMENTS

| | | | |
|---|---|---|---|
| 497,474 | 5/1893 | Miller | 209/270 |
| 1,254,160 | 1/1918 | Salinas et al. | 210/403 |
| 1,379,550 | 5/1921 | Gase | 209/407 |
| 2,204,928 | 6/1940 | Culver | 210/404 |
| 2,351,712 | 6/1944 | Sattele et al. | 210/402 |
| 2,582,273 | 1/1952 | Peterson et al. | 210/404 |
| 2,638,131 | 5/1953 | Rohs | 140/109 |
| 2,710,693 | 6/1955 | Manley et al. | 210/404 |
| 2,765,915 | 10/1956 | Nilsson | 210/403 |
| 3,954,622 | 5/1976 | Kus | 210/404 |
| 4,038,187 | 7/1977 | Saffran | 210/403 |
| 4,264,438 | 4/1981 | Frejborg | 209/270 |
| 4,308,143 | 12/1981 | harkins, Jr. et al. | 210/402 |
| 4,401,564 | 8/1983 | Epper et al. | 210/404 |
| 4,582,597 | 4/1986 | Huber | 204/313 |
| 5,124,037 | 6/1992 | Barloy | 210/450 |

FOREIGN PATENT DOCUMENTS

| | | | |
|---|---|---|---|
| 126653 | 11/1984 | European Pat. Off. | 210/402 |
| 669061 | of 0000 | United Kingdom . | |
| 548885 | 10/1942 | United Kingdom . | |
| 699061 | 10/1953 | United Kingdom . | |
| 724985 | 2/1955 | United Kingdom . | |

*Primary Examiner*—Cynthia L. Nessler
*Attorney, Agent, or Firm*—DeLio & Peterson

[57] ABSTRACT

The present invention relates to a screening device with a screening cartridge that consists of a cartridge frame and a flexible web of filter material that is stretched in the frame. In order to create a screening device in which both the screening cartridges as a whole as well as the filter cloth or the webs of filter material alone can be replaced very quickly and simply, the present invention proposes that the frame incorporate a groove that runs parallel to its periphery, the web of filter material being installed in the groove and held in place by means of a cord of elastic rubber material that is installed in the groove.

4 Claims, 3 Drawing Sheets

MICROSTRAINER FILTER DECK PANEL

FIELD OF THE INVENTION

The present invention relates to a screening device, in particular a fine-screening or micro-screening device, with a screening cartridge that consists of a cartridge frame and a flexible web of filter material that is clamped into the frame so as to be taut.

BACKGROUND OF THE INVENTION

Screening devices of the kind described in the preceding paragraph are known per se. In order to provide large mesh sizes and to screen out larger particles, the web consists of a flexible filter material, for example, a wire mesh a mesh that is made up of thick plastic fibers. In order to filter out smaller particles, so-called filter cloths are used; these generally consist of a textile material. For purposes of simplicity, reference hereinafter will be made to such filter cloth or cloths, without the invention being restricted to the use of such filter cloths.

In many screening or filtering systems, there is frequently a need to change the screening cartridge or a plurality of screening cartridges, or else simply replace the filter cloth, which may have become damaged or clogged.

In conventional screening devices, it is relatively costly to change the filter cloth, for it has to be clamped tightly within the frame in order that no unfiltered material passes the filter cloth.

SUMMARY OF THE INVENTION

The present invention is directed to the creation of a screening device in which both the screening cartridge as a whole, as well as the filter cloth or webs of filter material can be replaced rapidly and simply.

This problem has been solved in that the cartridge frame incorporates a groove that is parallel to its periphery, the web of filter material being inserted into this groove, where it is retained by means of a cord of elastic rubber material that is also installed within said groove. There are a variety of methods and means by which this cord of elastic rubber material can be retained within the groove. As an example, the cord can be installed in a recess in one part of the frame that is opposite the groove; then the filter cloth is laid over this rubber cord and the rubber cord and the filter cloth are pressed into the groove together, the part of the frame that incorporates the groove being pressed against the opposite part and fixed on this.

It is intended that the groove extend substantially around the total periphery of the frame in order that the filter cloth be held and sealed along the greatest possible part of the cartridge frame. However, the groove can be interrupted at some places, for example, where the elements of the frame abut against each other at an angle or where the clamping fastenings pass through the groove. In such a case, the rubber cord will then consist of sections of appropriate length, the length of these corresponding exactly to the uninterrupted sections of the groove.

In such a device, it is advantageous that only the clamping attachments need to be loosened, after which the filter cloth can be removed. What are preferred, however, are embodiments of the invention in which the filter cloth is held within the groove without the need for any additional clamping means. To this end, it is intended that the groove be of an essentially U-shaped cross section; undercut U-cross sections, such as, for example, dovetail cross sections, or other undercut cross section shapes are preferred for the groove.

Simultaneously, however, the groove should be so dimensioned that part of the cross section of the cord projects from the groove when the filter cloth is installed and the groove has been pressed into place, so that the frame element that incorporates the groove can be so clampled against a sealing surface that the protruding section of the cord is sealed against the sealing surface. Elastic materials of the type that are used, for example, in the manufacture of O-ring seals, are preferred for the cord.

The cord can be of almost any cross section, although rounded cross sections, e.g., a simple circular cross section, are preferred. It is self-evident that the cross section of the groove and the cross section of the cord are so matched to each other that, when it is pressed into the groove together with the filter cloth, the cord will be elastically deformed and thus be secured in the groove. This effect is enhanced mainly by the undercut shape of the groove. In the preferred embodiment of the invention, the cartridge frame consists of profile rails that are welded together at right angles, these rails having a U-shape or, more precisely, an almost Ω-shaped cross section. More expediently, such a frame is supported on its long sides by traverses or cross bars, because the filter cloth is stretched and is inclined to pull the profile rails, which yield more or less elastically, inwards and thus deform them. However, such cross strengthening can be eliminated in the case of a sufficiently stiff frame profile or correspondingly shorter frame edges.

Especially preferred is an embodiment of the present invention in which the cartridge frame is clamped in position with the open sides of the groove against a sealing surface, these sealing surfaces being provided, in their turn, on profile bars that can stretch across a correspondingly bigger frame to which a plurality of cartridge frames are secured. It is preferred that the profile bars have flat sealing surfaces, against which the sections of the elastic rubber cord, which has been pressed into the groove and which project therefrom, can be pressed with the help of a suitable clamping mechanism.

In a preferred embodiment of the present invention, clamping brackets are provided for this purpose; these press on the back side of the profile rails that are remote from the open side of the groove and press this onto the sealing surface. To this end, for example, screws can pass through the profile bars that are provided with the sealing surface or, they can be rigidly connected to screws on which nuts, preferably wing nuts, can be installed, these then pressing on the clamping brackets so as to press one profile rail or two profile rails of adjacent cartridge frames onto the sealing surface simultaneously. Particularly preferred is an embodiment of the present invention in which a plurality of cartridge frames with stretched filter cloths form the screening surfaces of a drum screen, the profile bars that incorporate the sealing surfaces spreading the frame of a drum screen.

DESCRIPTION OF THE DRAWINGS

Additional advantages, features, and possible applications of the present invention are described in the following description of a preferred embodiment and in the drawings appended hereto. These drawings show the following.

DETAILED DESCRIPTION OF THE INVENTION

Figure 1:
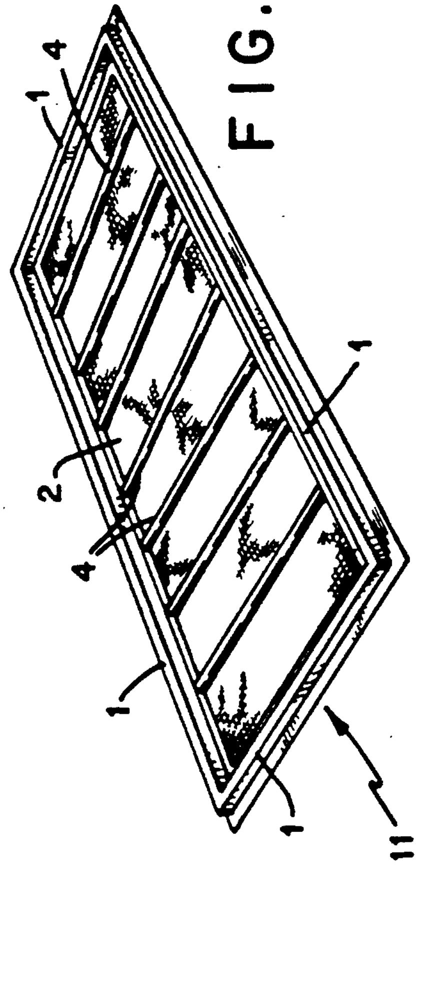
FIG. 1: a diagrammatic perspective view of a cartridge frame.

FIG. 1 shows a cartridge frame 11 as viewed from the back, the cartridge frame 11 being welded together from four profile rails that are mitre cut to form a long rectangular frame. Additional cross pieces or cross struts support the long sides relative to each other and hold them apart at a constant distance even if a stretched filter cloth 2 exerts tensile forces on the profile rails 1. The rail 1 is essentially Ω-shaped, so that a groove 12 that has an essentially flat bottom is formed. The resulting groove profile thus corresponds essentially to a so-called dovetail profile; the edges of this profile are more or less rounded and, together with two flanks that extend laterally outwards from the opening of the groove they form the Ω-profile, as can be seen clearly from the cross sections through the profile rails 1 in FIGS. 2 and 4.

The filter cloth 2 is installed in the groove 12 and then a rubber cord 3 is pressed into the groove 12 that contains the filter cloth 2, when the cross sectional area of the rubber cord 3 corresponds approximately to the cross section area of the groove 12, or else is somewhat larger than this, so that, in each instance, once the soft rubber cord has been pressed or tamped into place, part of the cross section of this cord projects beyond the plane of the groove opening, and preferably beyond the plane of the filter cloth 2 that lies on the edge of the groove. The cross section of the rubber cord 3 that is to be selected depends, of course, on the type of filter cloth 2 that is being used, for the thickness of this cloth will bring about a corresponding reduction of the cross section of the groove. However, in order that the filter cloth is held securely in the groove by the rubber cord that is tamped into position, the groove must, in each instance, be under-cut and the cord must be sufficiently thick that it can only be pushed through the narrow entry area of the groove by being elastically deformed, and can then expand once again in the under-cut area.

It is simple to release the rubber cord 3 and the filter cloth 2 by lifting one end of the rubber cord 3 out of the groove 12 and then pulling the rubber cord progressively from the groove 12 from this end, when the filter cloth 2 will also be released at the same time.

Figure 2:
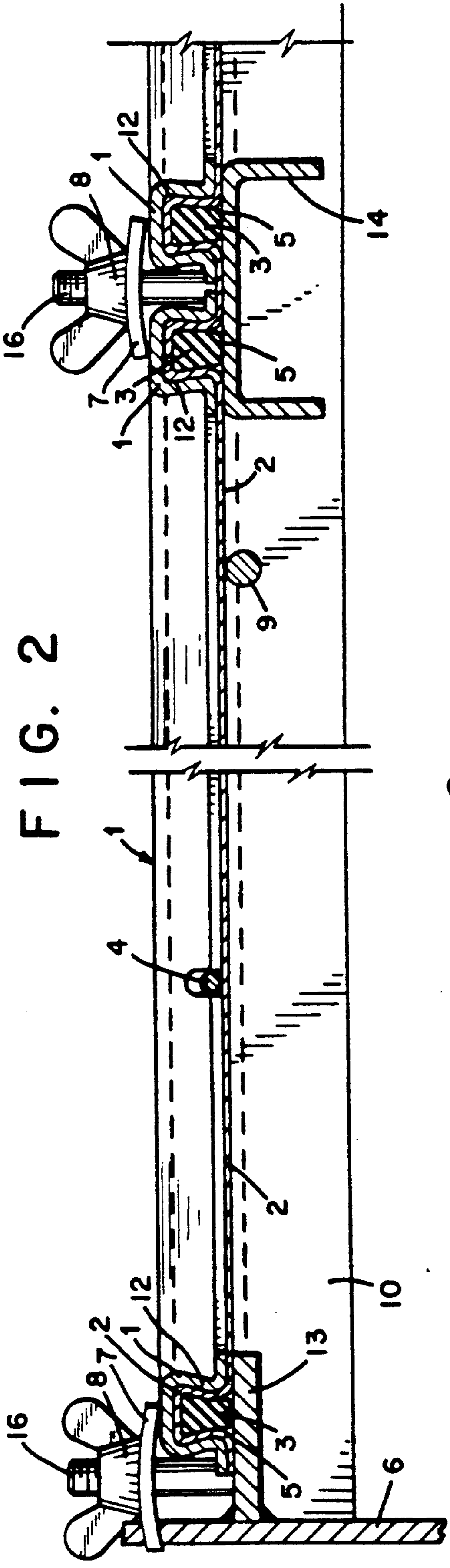
FIG. 2: a longitudinal section through a large frame of a screening device, on which a plurality of cartridges are secured one behind the other.

FIG. 2 is a cross section through a frame in which a plurality of cartridges 11 are arranged one behind the other along the length of the frame. The cross section passes through the two short profile rails of the frame 11 and through the cross pieces 4, of which one is shown in cross section in FIG. 2. The cross pieces 4 also serve as supporting surfaces for the filter cloth 2. Corresponding supporting rods 9 are also provided for the filter cloth 2 on the other side.

The face side 6 of the drum and of the screening frame as a whole incorporate sealing surfaces 5 that are provided either on strips 13 of flat material that are welded in place or on U-shaped profile bars 14, as can be seen in FIG. 2.

The flat material or the U-shaped profile bars, respectively, are provided with threaded pins 16 on which clamping brackets 7 are installed; these clamping brackets 7 incorporate drilled holes that correspond to the pins 16, and they are held on the pins by means of a wing nut 7. The edges of these clamping brackets, which, for example, can also be in the form of washers, press on the backs of the Ω-shaped profile rails 1 of the cartridge frame 11 and are pressed towards the sealing surface 5 by means of the wing nut 8, while the rubber cord 3 that projects from the groove 12 is pressed firmly against the sealing surface 5.

It is of course understood that a large number of appropriate screws and clamping brackets is provided around the periphery of the cartridge frame 11 in order to ensure that the rubber cord 3 provides a good seal, essentially around the whole periphery of the cartridge frame 11.

Figure 3A:
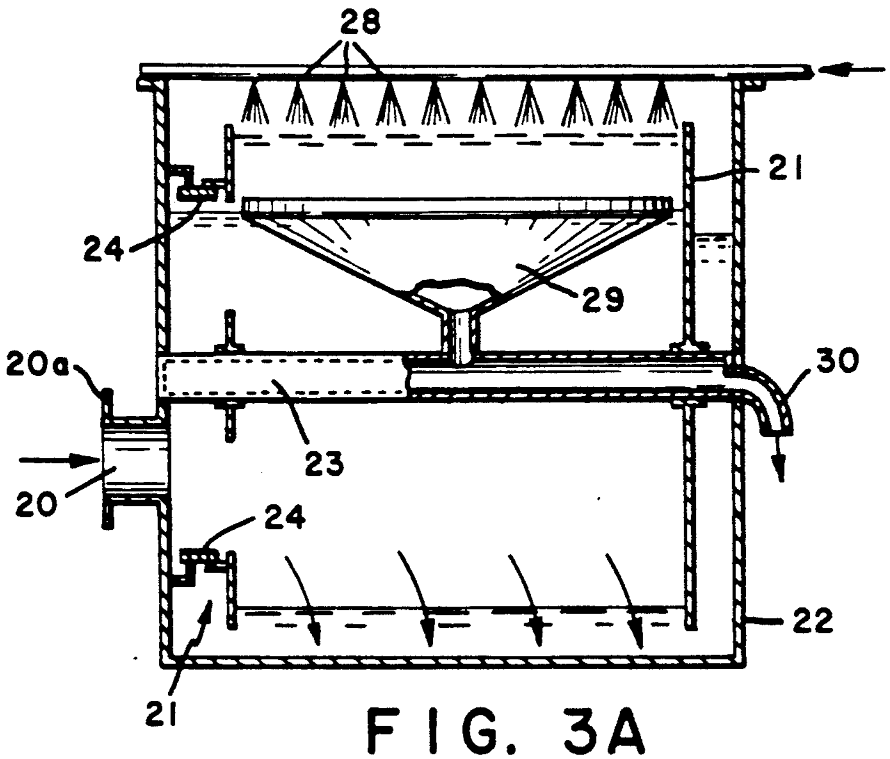
FIG. 3: a drum screening device in longitudinal and transverse cross section.
Figure 3B:
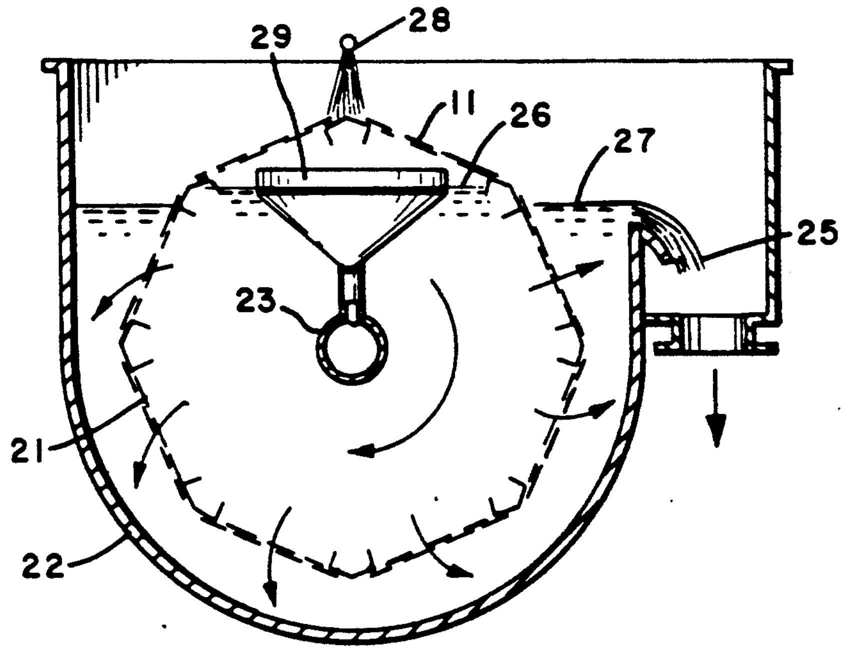

FIGS. 3A and 3B show longitudinal and cross sectional views, respectively, of a screening device, the drum periphery, of which is fitted with screening cartridges according to the present invention. In the longitudinal section, shown in FIG. 3A, there is on the left an inlet 20 into the drum 21, which is open at the face end. The drum 21 is supported so as to be able to rotate about a hollow shaft 23, within a catch basin 22, on its open face side, the drum 21 incorporates sliding seals 24 that prevent liquid that enters through the inlet 20 passing directly to the outer side of the screening drum 21. The liquid that is to be cleaned is pumped into the inlet 20 through a pipe that is connected and sealed to the flange 20*a* and then into the screening drum 21, whereupon the liquid reaches a specific level within the drum. As seen in FIG. 3B, the drum is of polygonal cross section, the peripheral surface of the drum being formed by a plurality of screening cartridges, as has been described in connection with FIG. 1 and FIG. 2. A plurality of cartridges of this kind can be arranged one behind the other in the axial direction of the drum, as is shown by way of example in FIG. 2. The catch basin 22 incorporates an overflow 25 for the cleaned liquid, which passes to the outside through the filter cloth of the screening cartridges. The filter cloths trap any suspended matter that is contained within the liquid. In order that water passes to the outside through the filter cloth in the required amount, the level of liquid 26 within the drum must, of course, be higher and maintained at a higher level than the external level 27 of liquid, as determined by the overflow 25.

A row of fan nozzles 28 is arranged above the screening drum and these direct a relatively fine but powerful stream of clean liquid, which is of more or less linear cross section, onto the upper side of the drum, which is to say from the outside and onto the filter cloth 2 as it passes by. The suspended matter from the liquid, which has been trapped by the filter cloth, is thus flushed off the inner surface of the filter cloth 2, when it passes into a catchment hopper 29, the outlet of which is connected to the inside of the hollow shaft 23. In this way, contaminants are constantly removed from the liquid and pass in concentrated form to a drain 30, from which they can be passed on for further processing or disposal. It is, of course, understood that the quantity of cleaned liquid that is dispensed by the fan nozzles 28 is considerably less than the quantity that is pumped through the inlet 20 and through the drum screen, for otherwise the desired concentration and cleaning effect would not occur.

Figure 4:
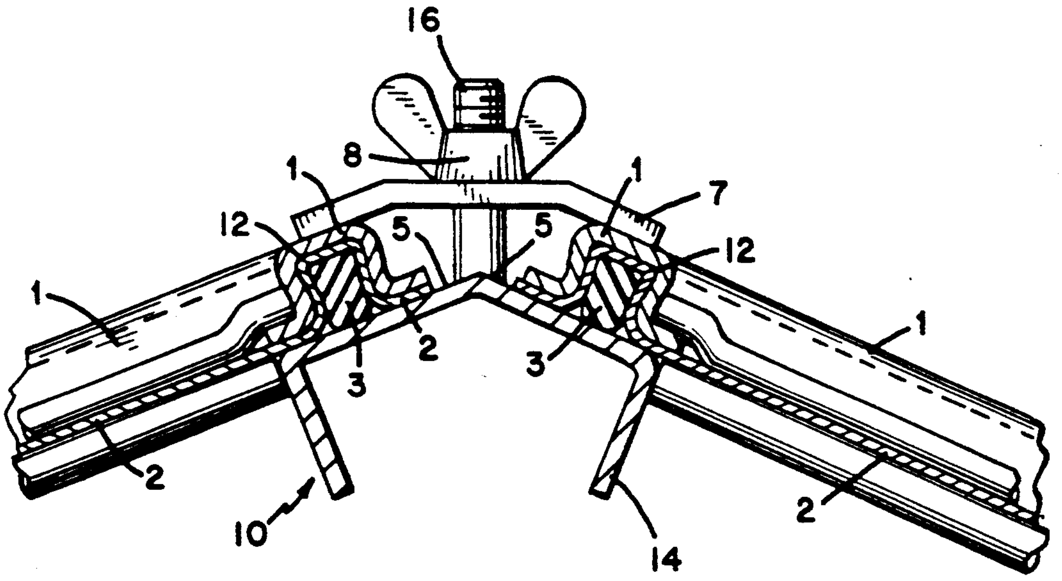
FIG. 4: a section from the cross section of a drum screen, which shows how adjacent cartridges are joined to each other at an angle.

FIG. 4 shows another part of a cross section of the above-described drum screen, in an area where two adjacent screening cartridges 11 are connected to each other in a corner area of the polygonal shape that is formed by the cross section of the drum. The frame 13 of the drum screen incorporates longitudinal bars 10 that are of essentially U-shaped cross section, although the bottom of the U-cross section is bent at the center to match the polygonal angle of the drum. In this way, two sealing surfaces 5 that are parallel to each other and are angled relative to each other are formed at the back, on which the profile rails 1 of the screening cartridge 11 can be pressed together with the installed rubber cords 3. The profile rails 14 run parallel to the axial direction of the drum 21, and because of their essentially U-shaped profile they have a relatively high degree of inherent stability and resistance to bending. This inherent stiffness is required because no supports can be attached in the center area of the drum because of the stationary catchment hopper 29. The screening frame as a whole is formed by the face walls of the drum (in FIG. 2 numbered 8 for any other frame shape), the strips of flat material or the rails 13, the longitudinal rods 10, and the profile bars 14.

However, supports can be incorporated in the peripheral direction, by means of beams of the drum frame, as for example on the side walls 6 of the drum, where any bending of the profile bars 14 and the longitudinal beams 10 is also to be avoided. Before it is tamped into the groove 12, the rubber cord is of essentially circular cross section, although it will be elastically deformed by being pressed into the groove, when part of its cross section will still protrude above the plane of the groove opening as well as beyond the filter cloth 2 that is lying on the groove edge. A plurality of threaded pins 16 is arranged along the length of the drum frame profiles 10, 14, or the rails 13, respectively, and these are spaced apart; a double-bend clamping bracket 7 is installed on these. The clamping bracket is preferably so formed in plan view that, after being rotated through 90°, its whole width lies between the adjacent profile rails 1 of the cartridge frame 11, so that this cartridge frame 11 can be removed easily from the drum without there being any need to remove the wing nuts 8 completely from the threaded pins 16 in order to do this. The angle of the end sections of the clamping bracket 7 relative to the middle section corresponds, in each instance, to half the polygonal angle of the screening drum. By loosening the wing nuts 8 or the clamping brackets 7, respectively, along the periphery of a cartridge frame 11, a plurality of which can be arranged in the axial direction of the drum, one behind the other, as is shown in FIG. 2, the corresponding cartridge frame 11 can be removed very simply, from the periphery of the drum and replaced rapidly by a similar type of cartridge frame that is of the same dimensions. After the clamping bracket has been secured, the drum can immediately be put into operation. In this way, it is possible to replace damaged cartridges or damaged filter cloths in the cartridges both quickly and simply without having to take the screening drum out of service for a long period of time. More expediently, to this end, a series of prepared cartridges are kept at readiness, and a defective cartridge or the defective filter cloth of a cartridge will be repaired immediately after removal from the screening drum or else replaced by a new filter cloth, whereupon the cartridge is available as a replacement at a later time.

The screening device according to the present invention is of relatively simple construction and easy to produce, and because of its simple replacement procedures and modular construction that is similar to that found in larger screening devices, for example screening drums, it has been shown to be flexible and cost-effective for operation of screening devices, for the long downtimes occasioned by replacement of the filter cloths can be eliminated.

I claim:

1. A screening drum comprising a drum having a mounting frame disposed on the periphery of said drum and a plurality of screening cartridges clamped to said frame, each of said plurality of screening cartridges comprising a cartridge frame and a flexible web of screening material stretched within said cartridge frame, said cartridge frame being formed from assembled profile rails, said assembled profile rails of said cartridge frame incorporating a groove that runs parallel to the periphery of said cartridge frame, said web of screening material having peripheral portions inserted in said groove, said groove further containing at least one cord of elastic material installed in said groove and projecting from an open side of said groove, said web of screening material being retained within said groove by said at least one cord of elastic material, said plurality of screening cartridges being clamped to said mounting frame by a plurality of clamping brackets, said mounting frame having a sealing surface, each of said plurality of clamping brackets engaging a back side of at least one of said profile rails with the open side of said groove facing said sealing surface, said cord of elastic material extending into sealing contact with said sealing surface.

2. A screening drum as defined in claim 1, wherein said groove is of essentially U-shaped cross section.

3. A screening drum as defined in claim 1, wherein said groove is of an under-cut cross section.

4. A screening drum as defined in claim 1, wherein said groove is of an essentially dovetail cross section.

* * * * *